(12) United States Patent
Calderada

(10) Patent No.: US 6,177,507 B1
(45) Date of Patent: Jan. 23, 2001

(54) POLYMERIZABLE COMPOSITIONS COMPRISING A URETHANE OLIGOMER AS CROSSLINKING AGENT, POLYMERS AND HYDRATED POLYMERS OBTAINED FROM THESE COMPOSITIONS, AND FINISHED AND SEMI-FINISHED ARTICLES FORMED USING THESE POLYMERS

(75) Inventor: Isabelle Calderada, Creteil (FR)

(73) Assignees: Essilor International Compagnie Generale d'Optique, Charenton Cedex (FR); Sunsoft Corporation, Albuquerque, NM (US)

(*) Notice: Under 35 U.S.C. 154(b), the term of this patent shall be extended for 0 days.

(21) Appl. No.: 09/171,218

(22) PCT Filed: Feb. 5, 1998

(86) PCT No.: PCT/FR98/00205

§ 371 Date: Oct. 13, 1998

§ 102(e) Date: Oct. 13, 1998

(87) PCT Pub. No.: WO98/36006

PCT Pub. Date: Aug. 20, 1998

(30) Foreign Application Priority Data

Feb. 14, 1997 (FR) .................................................. 97 01749

(51) Int. Cl.[7] ................ G02C 1/04; C08J 3/00; C08K 3/20; C08L 75/00; C08F 8/30

(52) U.S. Cl. ................ 524/590; 351/106 H; 351/106 R; 523/106; 524/507; 524/589; 525/123; 525/455; 525/920

(58) Field of Search ....................... 525/123, 455, 525/920; 523/106; 351/106 R, 106 H; 524/589, 590, 507

(56) References Cited

U.S. PATENT DOCUMENTS 4,376,800   3/1983   Lu et al. .

FOREIGN PATENT DOCUMENTS 0 000 507 A1   7/1978   (EP) .
0 453 149 A2   4/1991   (EP) .

OTHER PUBLICATIONS

"Polymeric hydrogel for soft contact lens mfr.—prepd. from polyvinyl pyrrolidone, hydroxyalkyl methacrylate and crosslinking agent," Database WPI, Week 8206, Derwent Publications Ltd., London, GB; AN 82–11569E.

*Primary Examiner*—Patrick Niland
(74) *Attorney, Agent, or Firm*—O'Keefe, Egan & Peterman

(57) ABSTRACT

The disclosed polymerizable compositions comprise a monomer or a mixture of hydrophilic monomers, as well as a crosslinking agent comprised of an oligomer or a mixture of urethane oligomers having a mole weight of between 500 and 5,000 and two to six (meth)acrylate functions. The invention can be used in the manufacture of contact lenses.

30 Claims, No Drawings

POLYMERIZABLE COMPOSITIONS COMPRISING A URETHANE OLIGOMER AS CROSSLINKING AGENT, POLYMERS AND HYDRATED POLYMERS OBTAINED FROM THESE COMPOSITIONS, AND FINISHED AND SEMI-FINISHED ARTICLES FORMED USING THESE POLYMERS

The present invention relates in a general manner to polymerizable compositions comprising a hydrophilic monomer or a mixture of hydrophilic monomers and a crosslinking agent which, after polymerization, results in crosslinked polymers which may be hydrated in order to form hydrogels having improved mechanical properties, in particular the elongation at break, while at the same time having a high degree of hydrophilicity which is often greater than that of the known hydrogel polymers.

The invention also relates to polymers obtained by polymerization of these polymerizable compositions as well as to the corresponding hydrated polymers (hydrogels).

The invention further relates to finished or semifinished articles formed from these polymers and hydrated polymers.

By way of articles which may advantageously be formed from the polymers and hydrated polymers according to the invention, mention may be made of ophthalmic articles, such as contact lenses, and separation membranes, for example membranes for reverse osmosis. The polymers according to the invention are particularly useful, when they have the appropriate transparency, for manufacturing ophthalmic articles such as contact lenses.

The materials for hydrophilic contact lenses must have simultaneously a certain number of advantageous characteristics, namely:
  a high degree of hydrophilicity; and
  good mechanical properties which make the contact lens suitable to be handled by its user.

This is because if the mechanical properties are insufficient the lens may unfortunately be torn or deformed by the user, and if the degree of hydrophilicity is too low the oxygen permeability of the lens may become insufficient, with the result that there is a risk of opacification of the cornea of the user's eye.

It is difficult to reconcile the two characteristics mentioned above in the same hydrogel material. This is because when the degree of hydrophilicity increases it is generally found that the mechanical properties of the hydrogel material fall.

In the field of contact lenses, it is known to use crosslinked polymers for their manufacture.

A well-known class of crosslinking agents in this field is the class of ethylene glycol dimethacrylate derivatives. However, the hydrogel polymers obtained by means of these crosslinking agents do not have the best combinations of mechanical properties and of degree of hydrophilicity.

In order to improve the mechanical properties of hydrogel polymers, it has been proposed in document U.S. Pat. No. 5,135,965 to crosslink these polymers by means of special crosslinking agents, which are unsaturated polymers, optionally combined with monomer crosslinking agents containing at least two olefin linkages per molecule.

Russian Inventor's Certification USSR 82 5548 proposes crosslinked hydrophilic polymer compositions whose transparency and mechanical properties are improved. The specific crosslinking agents envisaged in the above document are polyethylene glycol dimethacrylate having a molar mass of 1500 and a dimethacrylate oligourethane of 456 molar mass, the crosslinking agent being used in an amount ranging from 5 to 20% by weight.

It is therefore desirable to develop polymerizable compositions which, after polymerization, result in crosslinked hydrogel polymers having improved mechanical properties and high degrees of hydrophilicity.

The subject of the invention is therefore a polymerizable composition comprising a hydrophilic monomer or monomer mixture and a crosslinking agent which, after polymerization, provides a crosslinked hydrogel polymer having a high degree of hydrophilicity and mechanical properties, in particular an elongation at break, which are markedly improved.

The subject of the invention is also the polymers and hydrated polymers obtained by polymerizing the polymerizable compositions according to the invention.

The subject of the invention is also finished and semifinished articles formed from the above polymers, and particularly ophthalmic articles such as contact lenses.

According to the invention, the polymerizable composition comprises a hydrophilic monomer or hydrophilic monomer mixture and an effective amount of crosslinking agents, wherein the crosslinking agent comprises a urethane oligomer having a molar mass of between 500 and 5000, the limits being inclusive, and the chain of which carries two to six (meth)acrylate functional groups or a mixture of these polyurethane oligomers.

The polyurethane oligomers useful as crosslinking agents in the polymerizable compositions of the invention are therefore polyurethane oligomers functionalized by two to six acrylate and/or methacrylate functional groups, preferably two or three functional groups, more preferably with two chain end (meth)acrylate functional groups.

The functionalized polyurethane oligomers particularly recommended are difunctional oligomers, and most particularly those with two chain-end (meth)acrylate functional groups.

The polyurethane oligomers useful in the polymerizable compositions according to the invention have a molar mass of between 500 and 5000, the limits being inclusive, better still ranging from 500 to 3000 and even better still from 1000 to 3000.

According to the invention, the urethane oligomers useful as crosslinking agents may be aliphatic or aromatic oligomers, aliphatic oligomers being preferred.

Finally, among the urethane oligomers useful in the present invention, diacrylate polyurethane oligomers are particularly recommended.

The amount of urethane oligomer used in the compositions according to the invention must be an effective amount, that is to say sufficient to ensure appropriate crosslinking of the composition.

In general, the urethane oligomers useful as crosslinking agents in the polymerizable compositions according to the invention are used in an amount ranging from 0.05 to 4 parts by weight, preferably 0.1 to 1 part by weight and even better 0.1 to 0.5 parts by weight per 100 parts by weight of the mixture of monomers present in the initial polymerizable composition.

According to the invention, the urethane oligomers having a di(meth)acrylic or tri(meth)acrylic functional group may be obtained by reacting a polyol (diol or triol) with a polyfunctional polyisocyanate in the presence of a hydroxylated (meth)acrylate monomer.

In order to obtain di(meth)acrylate oligomers, the diol may be chosen from:
  linear aliphatic diols, such as alkanediols, polycaprolactonediols, polyetherdiols, polyesterdiols and polycarbonatediols, and aromatic diols.

Examples of aliphatic diols and processes for obtaining them are described in detail in patent U.S. Pat. No. 5,246,630.

The preferred diol is propylene glycol of formula:

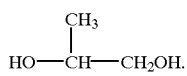

The polyisocyanate used may be of the aliphatic or aromatic type. Examples of aliphatic isocyanates which can be used are also described in U.S. Pat. No. 5,246,630.

The aliphatic urethane oligomers are obtained by reacting an aliphatic polyol with an aliphatic polyisocyanate.

In order to obtain an aromatic urethane oligomer, it is sufficient for at least one of the precursors, either the polyol or the polyisocyanate, to include an aromatic group.

The urethane oligomers according to the invention may also be obtained commercially.

By way of examples of urethane oligomers which can be used in the context of the present invention, and which are commercially available, mention may be made of the following products provided by Cray Valley:

CN 934—aliphatic diacrylate polyurethane, of 1200 molar mass;

CN 965—aliphatic diacrylate polyurethane, of 3000 molar mass;

CN 976—aromatic diacrylate polyurethane, of 1500 molar mass; and

CN 929—aliphatic triacrylate polyurethane, of approximately 1500 molar mass.

As mentioned above, the polymerizable compositions according to the invention contain a hydrophilic monomer or a hydrophilic monomer mixture.

Among the hydrophilic monomers which can be used, mention may be made of hydroxyalkyl (meth)acrylate, alkoxy derivatives of hydroxyalkyl (meth)acrylate, aminoalkyl (meth)acrylates, monovinyl ethers, monovinyl polyethers, hydroxylated vinyl ethers, N-vinyllactams, amido derivatives of (meth)acrylic compounds, ionic monomers, zwitterionic monomers, oligomers of the aforementioned monomers and mixtures thereof.

The recommended hydroxyalkyl (meth)acrylates are those whose alkyl group generally contains from 1 to 4 carbon atoms.

Specific examples of hydroxyalkyl (meth)acrylates are 2-hydroxyethyl methacrylate (HEMA), hydroxypropyl acrylate, hydroxypropyl (meth)acrylate and 2,3-dihydroxypropyl methacrylate (glyceryl methacrylate).

The recommended alkoxy derivatives of hydroxyalkyl (meth)acrylates are monoethoxylated, diethoxylated or triethoxylated compounds having an alkyl group generally containing from 1 to 4 carbon atoms.

Among the monomers of the N-vinyllactam type which can be used in the present invention, mention may be made of N-vinyl-2-pyrrolidone (NVP), N-vinyl-2-piperidone and N-vinylcaprolactam.

Among the amido derivatives of (meth)acrylic compounds useful as hydrophilic monomers in the composition of the present invention, mention may be made of (meth) acrylamide, N-methyl(meth)acrylamide, N-isopropyl(meth) acrylamide, N-diacetone (meth)-acrylamide, N,N-dimethyl (meth)acrylamide, N,N-dimethylaminomethyl-(meth) acrylamide, N,N-dimethylaminoethyl(meth)acrylamide and N-methylaminoisopropyl(meth)acrylamide.

Among the aminoalkyl (meth)acrylates useful as hydrophilic monomers in the compositions of the present invention, mention may be made of aminoethyl (meth) acrylate, dimethylaminoethyl methacrylate, methylaminoethyl methacrylate and diethylaminoethyl methacrylate.

Among the hydrophilic ionic monomers useful in the present invention, mention may be made of (meth)acrylic acid as well as cationic monomers, such as quaternary ammonium derivatives of (meth)acrylic acid.

Among the zwitterionic monomers, mention may be made of those described in Patent Application WO 92/07885. The latter monomers generally make it possible to reduce the affinity of the hydrogel with regard to proteins of the lachrymal medium.

Of course, the polymerizable composition according to the invention may include one of the above monomers, by itself, or else any mixtures of these monomers.

The preferred polymerizable compositions according to the invention include 2-hydroxyethyl methacrylate as hydrophilic monomer.

Among the hydrophilic monomer mixtures particularly recommended for the compositions of the present invention, mention may be made of 2-hydroxyethyl methacrylate/ acrylamide and/or N,N-dimethylacrylamide mixtures, optionally combined with glyceryl methacrylate (GMA).

Among the hydrophilic oligomers useful in the compositions of the present invention, polyvinyl-pyrrolidones may be mentioned by way of example.

In general, the hydrophilic monomer, or the hydrophilic monomer mixture, in the polymerizable compositions according to the invention represents at least 35% by weight with respect to the total weight of the monomers present in the initial polymerizable composition. Preferably, the hydrophilic monomer or hydrophilic monomer mixture represents 50% or more by weight with respect to the total weight of the monomers present in the initial polymerizable composition.

According to the invention, the polymerizable composition may furthermore include one or more hydrophobic monomers, the function of which is usually to enhance the mechanical properties of the final polymer matrix and/or to adjust its water content. As examples of hydrophobic monomers, mention may be made for example of alkyl (meth)acrylates and, in particular, methyl methacrylate (MMA). The latter hydrophobic monomer may advantageously be used in a mixture with a (meth)acrylate derivative of N-vinyllactam, such as N-vinylpyrrolidone.

An oligomer of the aforementioned hydrophobic monomers may also be used as hydrophobic monomers in the compositions of the invention.

When the hydrophobic monomers are present, they generally represent from 5 to 40%, preferably 10 to 30%, by weight with respect to the total weight of the monomers present in the initial composition.

According to the invention, in addition to the urethane oligomer having (meth)acrylate functional groups or the mixture of such oligomers, the polymerizable compositions of the invention may also contain one or more conventional crosslinking agents.

Examples of such conventional crosslinking agents are ethylene glycol di(meth)acrylate, polyethylene glycol di(meth)acrylates, such as diethylene glycol di(meth) acrylate, and triethylene glycol di(meth)acrylate; long-chain di(meth)acrylates, such as hexamethylene di(meth)acrylate; vinyl (meth)acrylate, allyl (meth)acrylate; divinylbenzene, diallyl phthalate and trimethacrylolpropane trimethacrylate.

When they are used, these conventional crosslinking agents, which differ from the urethane oligomers having (meth)acrylate functional groups, are used in conventional amounts generally of between 0.1 and 2 parts by weight per 100 parts by weight of the mixture of monomers present in the initial polymerizable composition.

The polymerizable composition according to the invention may also contain various conventional additives, such as colorants, photochromic pigments and UV absorbers.

The compositions according to the invention are compositions which can be polymerized by thermal and/or photochemical processes.

Preferably, the polymerizable compositions according to the invention also comprise conventional amounts of thermal initiators and/or photochemical initiators.

Among the thermal initiators which may be incorporated into the polymerizable compositions according to the invention, mention may be made of azotype initiators, such as azobis(isobutyronitrile) (AIBN) or azobis (dimethylvaleronitrile), or else peroxides, such as benzoyl peroxide or isopropyl percarbonate.

The photoinitiators which may be used in the polymerizable compositions according to the invention may be any compound producing free radicals under irradiation, whether by itself or in conjunction with another proton-donating compound. That is to say that the photoinitiators used may also be of the photocleavable type or photoactivable type.

A photocleavable photoinitiator comprises one or more compounds which operate by directly generating one or more free radicals which initiate the polymerization, while a photoactivable photoinitiator is formed from a system producing such radicals by a photo-assisted oxydo-reduction reaction between a light-absorbing compound and a hydrogen donor or electron donor, both these being present in the system. Of course, mixtures of these two types of photoinitiator may be used.

Examples of photocleavable compounds known per se are, for example, alkoxyacetophenone derivatives, benzoin ethers, phosphine oxides and benzoyloxime derivatives.

By way of examples of this first family of photoinitiators, mention may be made of:
DAROCURE® 1116, of formula:
DAROCURE® 1173, of formula:
or DAROCURE® 4265 (a mixture of aromatic ketones containing DAROCURE® 1173).

Examples of known photoactivable photoinitiators comprise a free-radical-producing absorber chosen from benzophenones, benzyl compounds, xanthones, anthrones, thioxanthones, fluorenones, suberones and acridones, in combination with, as proton donors, a compound of the ether, alcohol, amine or amino acid type, or organometallic compounds. Photoinitiators consisting of thioxanthones carrying an ionic radical may especially be used, such as those of the family described in U.S. Pat. No. 4,791,213, the absorption maximum of which lies in the 390 to 405 nanometer range.

The techniques for polymerizing the polymerizable compositions according to the invention are conventional and known by those skilled in the art. In particular, the polymerization may take place by a purely thermal process by a photochemical process or by combining both these processes.

When a combination of thermal and photochemical polymerization is used, it is preferable firstly to carry out a photochemical polymerization phase and then to complete the polymerization with a complementary thermal polymerization phase.

It is also possible, if required, to carry out the polymerization with an oxydo-reduction system. However, it is recommended to use conventional thermal and photochemical processes.

The polymerization may be carried out as a mass polymerization or in a solvent medium, as is conventional.

The articles obtained by polymerizing the polymerizable compositions according to the invention may be produced by molding the polymerizable composition directly in a mold having the desired shape and then by carrying out the polymerization of the polymerizable composition in the mold.

When the article produced is a finished article, the mold surfaces have the desired geometry and desired finish for the surfaces of the molded article.

It is also possible to manufacture a semi-finished article, in the dry state, having one of its surfaces, the geometry of which is defined, the other face being subjected to a machining operation after production so as to obtain the finished article.

The semi-finished article may be obtained either by carrying out a molding operation or, optionally, by carrying out a spin-casting operation conventional to those skilled in the art.

The polymers and articles obtained directly after molding and polymerization of the polymerizable compositions according to the invention are products in the dry state.

Hydrated polymers and articles may be obtained by subjecting them to hydration in an aqueous saline solution, for example a physiological serum, optionally buffered. This hydration is continued, generally at room temperature, for a time long enough to obtain saturation hydration of the polymer or article.

The hydrated polymers and articles (hydrogels) obtained have good mechanical properties, with an elongation at break varying from 40 to more than 300% and a tensile strength greater than or equal to 0.1 MPa and generally from 0.1 to 1.2 MPa.

The improvement in the mechanical properties, which is manifested whatever the degree of hydrophilicity of the article, is particularly pronounced in the case of polymers and articles having high degrees of hydrophilicity, greater than or equal to 40% and, in particular, within the 40 to 70% degree-of-hydrophilicity range.

Moreover, it has been noticed that the effectiveness of the urethane oligomers according to the invention, as crosslinking agents, is particularly pronounced in photochemical polymerization reactions.

Without wishing to be bound by any particular theory, it is believed that in the photopolymerization reaction, the setting into a gel and the forming of a solid phase are very rapid compared with a thermal polymerization reaction, so that migration of the chemical species present in the composition to the reactive sites is limited.

The average molar mass of the polymer thus obtained is lower than for the corresponding polymers obtained by a thermal process. It is therefore necessary, when employing a photochemical process, to use an effective crosslinking agent as otherwise the mechanical properties will suffer.

The specific crosslinking agents of the present invention make it possible, in this case, to obtain hydrogels with good mechanical properties.

EXAMPLES OF IMPLEMENTATION OF THE INVENTION

A/ Production of Contact Lenses

Polymerizable compositions are prepared by mixing the hydrophilic monomers and crosslinking agents given in the tables below and in the proportions given in these tables.

All the polymerizable compositions furthermore contain, as polymerization initiators, 0.2 parts by weight of azobis (isobutyronitrile) (AIBN) and 0.2 parts by weight of DARO-CURE® 4265 per 100 parts by weight of monomers present in the polymerizable composition.

The mixtures are homogenized using a magnetic stirrer and protected from the light.

Next, contact lenses are produced from these mixtures in the following manner:

Polypropylene molds are filled with these mixtures (150 µl per mold). The concave face of the mold allows the convex face of the lens to be obtained in its final geometry.

The mixtures in their molds are then irradiated for 20 minutes by a UV lamp (Vilbert Lourmat 3×15 W, reference VL-315 BL).

Next, the polymerization is continued for 45 minutes at 100° C. in a thermostatted oven until completion. The lenses are then machined, on the internal face (the concave face of the lens) and then hydrated overnight in a physiological serum, at room temperature.

The contact lenses obtained in the hydrated state have a thickness at the center which varies from 0.15 to 0.20 mm.

B/ Measurement of the Properties

1. Mechanical Properties

The percentage elongation at break of each contact lens in the hydrated state with respect to the initial dimension of the lens and the stress (in MPa) exerted at break are measured.

The principle of such a measurement has been shown diagrammatically in FIG. 1.

This measurement consists in exerting a force on the central part of the contact lens 1, on the concave face side, by an element 2 which can move along the geometrical axis of the lens, the latter moreover being clamped all around its perimeter by clamping means 3, 4. The movable element 2 in this case is a punch and the lens is maintained in an aqueous medium (isotonic solution). The lens is then subjected to deformation along the stress application axis until the material is seen to break (perforated lens).

In practice, a tension/compression apparatus is used which is equipped with a cage or monocolumn and with a 10 N load cell (Adamel-Lhomargy brand, reference DY31). The punch is made of stainless steel and has a diameter of 2.50 mm.

The measurement system includes a compression cell containing a 0.9% saline solution buffered to a pH of about 7.2 by a borate buffer.

The contact lens remains immersed in this saline solution throughout the measurement.

In general, a 0.9% saline solution or the equivalent solution in terms of osmolarity (of about 310 mOsm) with a pH of between 7.2 and 7.6, the limits being inclusive, may be used for the measurement.

The method of preparing such a solution is described in the ISO 10344 standard.

2. Degree of Hydrophilicity

The degree of hydrophilicity is measured on the final lenses hydrated to saturation using a 0.9% NaCl saline solution. The measurement device is an Atago hand refractometer graduated in % water.

3. Transparency

The transparency of the material is assessed by the naked eye in visible light.

EXPERIMENTAL TESTS

The 4 hydrophilic monomer mixtures below are prepared:

| Mixture | Concentration (percent by weight) |
|---|---|
| 1 HEMA/GMA/AA (AA = Acrylamide) | 80%/10%/10% |
| 2 HEMA/GMA/DMA (DMA = Dimethylacrylamide) | 80%/10%/10% |
| 3 HEMA/AA | 85%/15% |
| 4 HEMA/DMA | 85%/15% |

The method of preparing the mixtures, including the crosslinking agent, is identical to that described above, and various crosslinking agents according to the invention are tested in the case of each of the hydrophilic monomer mixtures at 3 different concentrations, namely 0.125 parts by weight, 0.250 parts by weight and 0.5 parts by weight.

By way of comparison, similar polymerizable compositions, comprising the same hydrophilic monomer mixtures but a conventional crosslinking agent, namely ethylene glycol dimethacrylate (EGDM) in the same proportions, were produced.

The urethane oligomer crosslinking agents used are the products sold by Cray Valley under the names:

CN 934—Aliphatic diacrylate polyurethane—1200 molar mass;

CN 965—Aliphatic diacrylate polyurethane—300 molar mass;

CN 976—Aromatic diacrylate polyurethane—1500 molar mass.

RESULTS OF THE TESTS

| MIXTURE 1-HEMA/GMA/AA | | | | |
|---|---|---|---|---|
| Cross-linking agent | Elongation (%) | Force (MPa) | Degree of hydro-philicity | Trans-parency |
| 0.125% concentration of crosslinking agent | | | | |
| DMEG | 45 ± 5 | 0.29 ± 0.02 | 52 ± 1 | yes |
| CN 934 | 55 ± 11 | 0.30 ± 0.02 | 53 ± 1 | yes |
| CN 965 | 54 ± 6 | 0.24 ± 0.02 | 54 ± 1 | yes |
| CN 976 | 56 ± 4 | 0.21 ± 0.01 | 54 ± 1 | yes |
| 0.25% concentration of crosslinking agent | | | | |
| DMEG | 40 ± 2 | 0.36 ± 0.01 | 52 ± 1 | yes |
| CN 934 | 108 ± 21 | 0.30 ± 0.04 | 56 ± 0 | yes |
| CN 965 | 50 ± 4 | 0.27 ± 0.01 | 56 ± 1 | yes |
| CN 976 | 120 ± 36 | 0.30 ± 0.05 | 57 ± 0 | yes |
| 0.5% concentration of crosslinking agent | | | | |
| DMEG | 38 ± 1 | 0.39 ± 0.03 | 51 ± 0 | yes |
| CN 934 | 105 ± 33 | 0.36 ± 0.05 | 52 ± 1 | yes |
| CN 965 | 47 ± 3 | 0.25 ± 0.01 | 55 ± 1 | yes |
| CN 976 | 47 ± 4 | 0.28 ± 0.01 | 52 ± 1 | yes |

| MIXTURE 2-HEMA/GMA/DMA | | | | |
|---|---|---|---|---|
| Cross-linking agent | Elongation (%) | Force (MPa) | Degree of hydro-philicity | Trans-parency |
| 0.125% concentration of crosslinking agent | | | | |
| DMEG | 41 ± 4 | 0.29 ± 0.02 | 52 ± 0 | yes |
| CN 934 | 44 ± 5 | 0.18 ± 0.00 | 52 ± 0 | yes |
| CN 965 | 40 ± 2 | 0.19 ± 0.01 | 53 ± 1 | yes |
| CN 976 | 53 ± 9 | 0.21 ± 0.01 | 52 ± 1 | yes |
| 0.25% concentration of crosslinking agent | | | | |
| DMEG | 46 ± 6 | 0.32 ± 0.01 | 50 ± 1 | yes |
| CN 934 | 127 ± 29 | 0.34 ± 0.06 | 55 ± 0 | yes |
| CN 965 | 68 ± 9 | 0.25 ± 0.02 | 52 ± 1 | yes |
| CN 976 | 51 ± 4 | 0.24 ± 0.00 | 51 ± 0 | yes |
| 0.5% concentration of crosslinking agent | | | | |
| DMEG | 35 ± 2 | 0.37 ± 0.01 | 49 ± 1 | yes |
| CN 934 | 60 ± 14 | 0.27 ± 0.02 | 50 ± 1 | yes |
| CN 965 | 58 ± 8 | 0.25 ± 0.02 | 50 ± 1 | yes |
| CN 976 | 55 ± 5 | 0.28 ± 0.01 | 50 ± 1 | yes |

MIXTURE 3-HEMA/AA

| Cross-linking agent | Elongation (%) | Force (MPa) | Degree of hydro-philicity | Trans-parency |
|---|---|---|---|---|
| 0.125% concentration of crosslinking agent | | | | |
| DMEG | 82 ± 16 | 0.18 ± 0.02 | 55 ± 0 | yes |
| CN 934 | 341 ± 11 | 0.14 ± 0.02 | — | ) |
| CN 965 | 177 ± 45 | 0.13 ± 0.01 | — | ) opaque |
| CN 976 | 198 ± 32 | 0.17 ± 0.02 | — | ) |
| 0.25% concentration of crosslinking agent | | | | |
| DMEG | 54 ± 4 | 0.24 ± 0.03 | 54 ± 0 | yes |
| CN 934 | 214 ± 27 | 0.22 ± 0.03 | 57 ± 0 | yes |
| CN 965 | 260 ± 40 | 0.29 ± 0.07 | 58 ± 1 | yes |
| CN 976 | 239 ± 26 | 0.13 ± 0.01 | | opaque |
| 0.5% concentration of crosslinking agent | | | | |
| DMEG | 38 ± 3 | 0.29 ± 0.01 | 52 ± 1 | |
| CN 934 | 274 ± 32 | 0.34 ± 0.06 | 57 | yes |
| CN 965 | 216 ± 20 | 0.20 ± 0.02 | 59 ± 1 | yes |
| CN 976 | 166 ± 26 | 0.18 ± 0.03 | 50 | yes |

MIXTURE 4-HEMA/DMA

| Cross-linking agent | Elongation (%) | Force (MPa) | Degree of hydro-philicity | Trans-parency |
|---|---|---|---|---|
| 0.125% concentration of crosslinking agent | | | | |
| DMEG | 85 ± 18 | 0.19 ± 0.02 | 53 ± 1 | |
| CN 934 | 360 ± 17 | 0.19 ± 0.05 | — | ) opaque |
| CN 965 | 343 ± 13 | 0.09 ± 0.03 | — | ) |
| CN 976 | 222 ± 20 | 0.13 ± 0.02 | 47 ± 0 | ) |
| 0.25% concentration of crosslinking agent | | | | |
| DMEG | 63.20 ± 6 | 0.24 ± 0.02 | 51 ± 1 | |
| CN 934 | 365 ± 2 | 0.20 ± 0.01 | | ) opaque |
| CN 965 | 339 ± 24 | 0.129 ± 0.06 | | ) |
| CN 976 | 124 ± 31 | 0.15 ± 0.02 | | ) |
| 0.5% concentration of crosslinking agent | | | | |
| DMEG | 39 ± 5 | 0.27 ± 0.02 | 49 ± 0 | |
| CN 934 | 261 ± 48 | 0.27 ± 0.06 | 55 ± 0 | |
| CN 965 | 348 ± 35 | 0.16 ± 0.03 | | opalescent |
| CN 976 | 2176 ± 36 | 0.25 ± 0.06 | 53 ± 0 | |

What is claimed is:

1. A polymerizable composition comprising a hydrophilic monomer or hydrophilic monomer mixture and 0.05 to 4 parts by weight per hundred parts by weight of the agent, wherein the crosslinking agent comprises a urethane oligomer having a molar mass of between 500 and 5000, the limits being inclusive, and the chain of which carries two to six (meth)acrylate functional groups, or a mixture of these urethane oligomers, said polymerizable composition after polymerization resalting in a cross-linked polymer material having a degree of hydrophilicity of greater than 40 percent.

2. The polymerizable composition as claimed in claim 1, wherein the urethane oligomer(s) has(have) a molar mass of between 500 and 3000, the limits being inclusive.

3. The polymerizable composition as claimed in claim 1, wherein the urethane oligomer(s) carries (carry) two or three (meth)acrylate functional groups.

4. The polymerizable composition as claimed in claim 1, wherein the urethane oligomer(s) carries (carry) two (meth) acrylate functional groups.

5. The polymerizable composition as claimed in claim 1, wherein the urethane oligomer(s) includes (include) two chain-end terminal (meth)acrylate functional groups.

6. The polymerizable composition as claimed in claim 1, wherein the functional groups carried by the urethane oligomer(s) are acrylate functional groups.

7. The polymerizable composition as claimed in claim 1, wherein the urethane oligomer(s) is (are) an aliphatic oligomer(s).

8. The polymerizable composition as claimed in claim 1, wherein the urethane oligomer or the urethane oligomer mixture is present in the composition in an amount of 0.1 to 1 part by weight per 100 parts by weight of the monomers present in the composition.

9. The polymerizable composition as claimed in claim 1, wherein the urethane oligomer or the urethane oligomer mixture is present in the composition in an amount of 0.1 to 0.5 parts by weight per 100 parts by weight of the monomers present in the composition.

10. The polymerizable composition as claimed in claim 1, wherein the hydrophilic monomers are chosen from the group consisting of hydroxyalkyl (meth)acrylates, alkoxy derivatives of hydroxyalkyl (meth)acrylates, aminoalkyl (meth)acrylates, monovinyl ethers, monovinyl polyethers, hodroxylated vinyl ethers, N-vinyllactams, amido derivatives of (meth)acrylic compounds, ionic monomers, zwitterionic monomers, oligomers of the aforementioned monomers, and mixtures thereof.

11. The polymerizable composition as claimed in claim 10, wherein:
   the hydroxyalkyl (meth)acrylates are chosen from 2-hydroxyethyl methacrylate, hydroxypropyl (meth) acrylate, 2,3-dihydroxypropyl methacrylate, and mixtures thereof;
   the N-vinyllactams are chosen from N-vinyl-2-pyrrolidone, N-vinyl-2-piperidone, N-vinylcaprolactam, and mixtures thereof;
   the amido derivatives of meth(acrylic) compounds are chosen from (meth)acrylamide, N-methyl(meth) acrylamide, N-isopropyl(meth)acrylamide, N-diacetone (meth)acrylamide, N,N-dimethyl(meth) acrylamide, N,N-dimethylaminomethyl(meth) acrylamide, N,N-dimethylaminoethyl(meth) acrylamide, N-methylaminoisopropyl-(meth) acrylamide and mixtures thereof;
   the aminoalkyl (meth)acrylates are chosen from amino-ethyl (meth)acrylate, dimethylaminoethyl methacrylate, methylaminoethyl methacrylate, dioctylaminoethyl methacrylate, and mixtures thereof; and
   the ionic monomers are chosen from (meth)acrylic acid and the quaternary ammonium derivatives of (meth) acrylic acid.

12. The polymerizable composition as claimed in claim 1, which comprises at least 35% by weight of the hydrophilic monomer or hydrophilic monomer mixture with respect to the total weight of the monomers present in the composition.

13. The composition as claimed in claim 12, which comprises at least 50% by weight of the hydrophilic monomer or hydrophilic monomer mixture.

14. The composition as claimed in claim 1, which furthermore comprises one or more hydrophobic monomer.

15. The composition as claimed in claim 14, wherein the hydrophobic monomers are chosen from alkyl (meth) acrylates.

16. The composition as claimed in claim 14, which comprises 5 to 40% by weight of hydrophobic monomers with respect to the total weight of the monomers present in the composition.

17. The composition as claimed in claim 1, which furthermore comprises one or more crosslinking agents different from the urethane oligomer crosslinking agent.

18. The composition as claimed in claim 17, wherein the additional crosslinking agent other than the urethane oligomer is chosen from ethylene glycol di(meth)acrylate, polyethylene glycol di(meth)acrylates, ($C_4$–$C_8$) polymethylene di(meth)acrylates, vinyl (meth)acrylate, allyl (meth)acrylate, divinylbenzene, diallylphthalate and trimethacryloylpropane trimethacrylate.

19. The composition as claimed in claim 17, wherein the crosslinking agent other than the urethane oligomer is present in an amount of 0.1 to 2 parts by weight per 100 parts by weight of the monomers present in the polymerizable composition.

20. The composition as claimed in claim 1, which includes one or more additives chosen from colorants, photochromic pigments and UV absorbers.

21. The composition as claimed in claim 1, which furthermore comprises a thermal polymerization initiator and/or a photopolymerization initiator.

22. The composition as claimed in claim 21, wherein the thermal polymerization initiator is chosen from azo derivatives and peroxides.

23. The composition as claimed in claim 21, wherein the photopolymerization initiator is a photoactivable or photocleavable initiator and a mixture of these initiators.

24. The composition as claimed in claim 23, wherein the photoactivable initiator is chosen from benzophenones, benzyl compounds, xanthanes, anthrones, thioxanthanes, fluorenones, siberones and acridones in association with a proton donor chosen from ethers, alcohols, amines, aminoacids and organometallic compounds; and the photocleavable photoinitiator is chosen from alkoxyacetophenone derivatives, benzoin ethers, phosphine oxides and benzoyloxime derivatives.

25. A polymer obtained by polymerizing the polymerizable compositions as claimed in claim 1.

26. A hydrated polymer obtained by saturation hydration in an aqueous saline solution of a polymer as claimed in claim 25.

27. The hydrated polymer according to claim 26, which has a degree of hydrophilicity of between more than 40% and 70%.

28. A finished or semifinished article formed from the polymer as claimed in claim 25.

29. The finished article formed from the hydrated polymer as claimed in claim 26.

30. The article as claimed in claim 29, which consists of a contact lens.

* * * * *